United States Patent
Takada et al.

(10) Patent No.: US 11,905,182 B2
(45) Date of Patent: Feb. 20, 2024

(54) FRICTION MATERIAL

(71) Applicant: AKEBONO BRAKE INDUSTRY CO., LTD., Tokyo (JP)

(72) Inventors: Takuya Takada, Tokyo (JP); Motoyuki Miyaji, Tokyo (JP); Kentaro Owa, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 1051 days.

(21) Appl. No.: 16/637,060

(22) PCT Filed: Aug. 8, 2018

(86) PCT No.: PCT/JP2018/029814
§ 371 (c)(1),
(2) Date: Feb. 6, 2020

(87) PCT Pub. No.: WO2019/031557
PCT Pub. Date: Feb. 14, 2019

(65) Prior Publication Data
US 2020/0239327 A1    Jul. 30, 2020

(30) Foreign Application Priority Data
Aug. 8, 2017  (JP) ................ 2017-153092

(51) Int. Cl.
*C01G 49/06* (2006.01)
*C09K 3/14* (2006.01)
*F16D 69/02* (2006.01)

(52) U.S. Cl.
CPC .......... *C01G 49/06* (2013.01); *C09K 3/14* (2013.01); *C01P 2004/60* (2013.01); *C01P 2006/14* (2013.01); *F16D 69/027* (2013.01)

(58) Field of Classification Search
CPC ....... C01G 49/06; C09K 3/14; C01P 2004/60; C01P 2006/14; C01P 2002/30; C01P 2004/51; C01P 2004/61; C01P 2006/80; F16D 69/027; F16D 2200/0069; F16D 69/026
See application file for complete search history.

(56) References Cited

U.S. PATENT DOCUMENTS

| | | | |
|---|---|---|---|
| 11,359,689 B2 * | 6/2022 | Aga ................ C01G 49/06 |
| 2017/0219037 A1 | 8/2017 | Yamamoto et al. |
| 2019/0337818 A1 | 11/2019 | Aga et al. |
| 2020/0003268 A1 | 1/2020 | Aga et al. |

FOREIGN PATENT DOCUMENTS

| | | |
|---|---|---|
| CN | A-101597476 | 12/2009 |
| CN | A-110062799 | 7/2019 |
| CN | A-110072965 | 7/2019 |
| JP | 2010-77341 A | 4/2010 |
| JP | 2016-35005 A | 3/2016 |
| RU | C1-2006344 | 1/1994 |
| WO | WO-2016/175284 A1 | 11/2016 |
| WO | WO-2017/170532 A1 | 10/2017 |
| WO | WO-2018/110562 A1 | 6/2018 |
| WO | WO-2018/110563 A1 | 6/2018 |

OTHER PUBLICATIONS

Second Office Action dated Sep. 15, 2021 in Chinese Patent Application No. 201880051905.8 (6 pages) with an English translation (7 pages).
Wenting et al., "Effect of Porosity Percentage on Friction and Wear Performance of Resin-based Friction Materials," Lubrication Engineering, vol. 41, No. 6, pp. 59-64, Jun. 15, 2016 with English abstract.
CN Office Action dated Jan. 28, 2021 in Chinese Application No. 201880051905.8 (with attached English-language translation).
Ying Han, "Pollution Control of Pulping and Papermaking", Second Edition, China Light Industry Press, Jan. 31, 2016, p. 333.
International Search Report dated Sep. 25, 2018 for PCT/JP2018/029814.
International Search Report/Written Opinion dated Sep. 25, 2018 for PCT/JP2018/029814.
Notification of Reasons for Refusal dated Jun. 29, 2021 in Japanese Patent Application No. 2017-153092 (3 pages) with an English translation (4 pages).
Extended European Search Report dated Apr. 14, 2021 in corresponding European Patent Application No. 18844610.8 (7 pages).

* cited by examiner

*Primary Examiner* — Anthony J Green
(74) *Attorney, Agent, or Firm* — Faegre Drinker Biddle & Reath LLP

(57) ABSTRACT

A friction material includes granulated hematite fired particle. The granulated hematite fired particle has 25 μm to 300 μm of an average particle diameter. The granulated hematite fired particle has 30 mm$^3$/g to 300 mm$^3$/g of a fine pore volume.

4 Claims, No Drawings

FRICTION MATERIAL

TECHNICAL FIELD

The present invention relates to a friction material used for disc brake pads, brake linings, clutch facings, and the like of automobiles, railway vehicles, industrial machines, and the like.

BACKGROUND ART

With a recent increase in performance and speed of vehicles, a load on a brake has increased. In addition, in light of the demand for lighter vehicles, a friction material is required to have fade resistance and abrasion resistance at high temperatures.

Therefore, to maintain a friction coefficient and improve abrasion resistance at high temperatures, Patent Literature 1 discloses a brake friction material containing at least a reinforcing fiber, a binder, a lubricant, a friction modifier, and a filler, which contains 5 mass % to 10 mass % of a steel fiber, 5 mass % to 10 mass % of a copper fiber having 2 mm to 3 mm of an average fiber length, and 2 mass % to 5 mass % of zinc powder having 5 μm to 75 μm of a particle diameter when a total amount of the brake friction material is 100 mass %.

However, in the friction material containing a copper component as the friction material described in Patent Literature 1, a copper component is contained in wear debris generated during braking, which may be a cause of contaminating rivers, lakes, oceans, and the like. Therefore, there is a growing movement to limit the use thereof.

Under this background, a bill that prohibits the sale of a friction member using a friction material containing 0.5 mass % or more of a copper component and assembly the friction member into a new vehicle since 2024 has been approved in California and Washington, USA.

On the other hand, characteristics of the copper component are indispensable for the friction material used in a disc brake pad, and it has been clarified that abnormal noise is easily generated by removing the copper component from the friction material.

Therefore, various proposals have been made to reduce the generation of the abnormal noise. For example, Patent Literature 2 discloses a friction material that is molded from a friction material composition of a non asbestos organic (NAO) material free of a copper component and is used for a disc brake pad, in which the friction material composition is substantially free of an iron component, and contains 15 wt % to 25 wt % of a non-whisker-like titanate as a titanate based on a total amount of the friction material composition, 15 wt % to 25 wt % of zirconium oxide having 1.0 μm to 4.0 μm of an average particle diameter as an inorganic friction modifier based on the total amount of the friction material composition, and 4 wt % to 6 wt % of cleavable mineral particles as an inorganic friction modifier based on the total amount of the friction material composition.

The friction material described in Patent Literature 2 is said to be able to prevent the generation of abnormal noise at the time of stop while satisfying the laws and regulations relating to the content of the copper component.

CITATION LIST

Patent Literature

Patent Literature 1: JP-A-2010-77341
Patent Literature 2: JP-A-2016-35005

SUMMARY OF INVENTION

Technical Problem

The present invention has been made in view of the above circumstances in the related art, and an object thereof is to provide a friction material which can reduce abnormal noise when a brake pedal is released at the start of creep (hereafter referred to as creep abnormal noise), even when a certain number of times of light load braking is repeated, regardless of the presence or absence of a copper component, ensure sufficient fade resistance and reduce aggressiveness against the counterpart material.

Solution to Problem

As a result of intensive studies, the present inventors have found that the above problem can be solved by containing specific granulated hematite fired particles in a friction material. Thus, the present invention has been completed.

That is, the present invention relates to the following <1> to <4>.

<1> A friction material including: granulated hematite fired particle having 25 μm to 300 μm of an average particle diameter and 30 mm³/g to 300 mm³/g of a fine pore volume.

<2> The friction material according to <1>, wherein 5 mass % to 25 mass % of the granulated hematite fired particle is contained.

<3> The friction material according to <1> or <2>, wherein a content of a copper component is 0.5 mass % or less.

<4> The friction material according to <2>, wherein a content of a copper component is 0.5 mass % or less.

Effects of Invention

According to the present invention, it is possible to provide a friction material which can reduce creep abnormal noise even when a certain number of times of light load braking is repeated, regardless of the presence or absence of the copper component, ensure sufficient fade resistance and reduce aggressiveness against the counterpart material.

DESCRIPTION OF EMBODIMENTS

Hereinafter, the present invention will be explained below in detail, but the following explanations only show an example of preferred embodiments, the present invention is not limited thereto.

In the present description, "mass" has the same meaning as "weight".

The friction material of the present invention contains a friction modifier, a fibrous material, and a binder.

Hereinafter, each component will be described in detail.
<Friction Modifier>

The friction modifier is used to impart desired friction properties such as abrasion resistance, heat resistance, and fade resistance to the friction material. The friction material of the present invention is characterized in that granulated hematite fired particle having a specific average particle diameter and fine pore volume is used.

(Granulated Hematite Fired Particle)

The granulated hematite fired particle is a particle obtained by granulating and firing hematite ($Fe_2O_3$), and fine pore is formed in the particle. Since the fine pore is formed in the particle, gas generated by decomposition of organic components in the friction material due to temperature rise at high load can escape from the fine pore to the outside of the friction material, so that fade resistance can be improved. Examples of a crystal structure of hematite ($Fe_2O_3$) include $\alpha\text{-}Fe_2O_3$, $\beta\text{-}Fe_2O_3$, $\gamma\text{-}Fe_2O_3$, and $\varepsilon\text{-}Fe_2O_3$. Any structure can be used as a raw material. From the viewpoint of availability, $\alpha\text{-}Fe_2O_3$ is desirably used.

In the present invention, from the viewpoint of preventing the generation of creep abnormal noise, granulated hematite fired particle having 25 μm to 300 μm of an average particle diameter and 30 $mm^3/g$ to 300 $mm^3/g$ of a fine pore volume (hereinafter, also referred to as granulated hematite fired particle of the present invention) is used.

It is considered that an average particle diameter of wear debris generated by friction between the friction material and a counterpart material depends on an average particle diameter of blending components of the friction material. On the other hand, it is presumed that wear debris generated by light load braking is fine and is likely to remain at a friction interface between the friction material and the counterpart material, and by repeating the light load braking, the wear debris is crushed and is finer, and creep abnormal noise is more likely to occur.

The light load braking refers to braking at 40 km/h or less of a speed and 1.47 $m/s^2$ or less of a deceleration.

Since the granulated hematite fired particle of the present invention having 25 μm or more of an average particle diameter by granulation is used, the wear debris is less likely to be subdivided, and the generation of the creep abnormal noise can be prevented.

When the average particle diameter of the granulated hematite fired particle is too large, aggressiveness against the counterpart material increases, so that granulated hematite fired particle having 300 μm or less of an average particle diameter is used.

Condensation may occur due to a temperature difference when the friction material is left overnight. Even when moisture generated by condensation gets into a sliding surface and the wear debris is kneaded with water, if the average particle diameter of the granulated hematite fired particle is within the above range, the average particle diameter of the wear debris increases, and the wear debris is easily discharged from the friction interface. Therefore, the generation of the creep abnormal noise is prevented.

From the viewpoint of discharge of the wear debris, the average particle diameter of the granulated hematite fired particle of the present invention is preferably 40 μm or more and 150 μm or less.

The average particle diameter of the granulated hematite fired particle of the present invention is calculated by measuring a median diameter D50 using a laser diffraction type particle size distribution measurement device.

As described above, since granulated hematite fired particle has a fine pore therein, the gas generated by the decomposition of the organic components in the friction material due to the temperature rise at high load is discharged through the fine pore, so that a fade phenomenon can be prevented.

Since the fine pore volume of the granulated hematite fired particle of the present invention is 30 $mm^3/g$ or more, the generated gas can be discharged. When the fine pore volume is more than 300 $mm^3/g$, the granulated hematite fired particle is easily broken due to the friction, so that the fine pore volume is set to 300 $mm^3/g$ or less.

The fine pore volume of the granulated hematite fired particle of the present invention is preferably 100 $mm^3/g$ or more and 200 $mm^3/g$ or less, from the viewpoint of achieving fade resistance and aggressiveness against the counterpart material.

The fine pore volume of the granulated hematite fired particle can be measured using a mercury porosimeter.

The granulated hematite fired particle of the present invention preferably has 2.0 $g/cm^3$ or less of an apparent density, from the viewpoint of achieving the fade resistance and aggressiveness against the counterpart material.

The apparent density of the granulated hematite fired particle can be measured according to JIS Z 2504:2012.

A content of the granulated hematite fired particle of the present invention in the entire friction material is preferably 5 mass % to 25 mass % and more preferably 7 mass % to 15 mass %.

The content of 5 mass % or more is preferred since effects of reducing the creep abnormal noise and ensuring sufficient fade resistance in the present invention are improved.

The content of 25 mass % or less is preferred since the effect of reducing aggressiveness against the counterpart material in the present invention is improved. Further, other components necessary for the friction material such as an abrasive and a lubricant can be sufficiently contained.

The granulated hematite fired particle of the present invention has no magnetism, which is distinguished from triiron tetroxide (magnetite, $Fe_3O_4$) generally used in friction materials.

Here, in the present description, "no magnetism" refers to a state where a value of residual magnetization (emu/g) is, for example, about 0.1.

The value of residual magnetization (emu/g) can be measured by an automatic magnetization characteristic measurement device.

The granulated hematite fired particle of the present invention is obtained by crushing natural hematite ore, adding water and a dispersant and a binder as necessary thereto, and mixing the above components to prepare a slurry, adjusting the viscosity of the slurry, then granulating and drying the slurry by spray drying, and removing the binder at a firing temperature of 800° C. to 1100° C.

(Other Friction Modifiers)

The friction modifier contained in the friction material of the present invention can be appropriately mixed with an inorganic filler, an organic filler, an abrasive, a solid lubricant, and the like in addition to the granulated hematite fired particle. Preferably, 76 mass % to 82 mass % of the friction modifier in the friction material of the present invention is used in the entire friction material.

Examples of the inorganic filler include inorganic materials such as titanate compound, barium sulfate, calcium carbonate, calcium hydroxide, vermiculite and mica, and powder of metals such as aluminum, tin and zinc. These can be used alone or in combination of two or more thereof.

Here, examples of the titanate compound include potassium titanate, lithium titanate, lithium potassium titanate, sodium titanate, calcium titanate, magnesium titanate, magnesium potassium titanate, barium titanate, and the like. From the viewpoint of improving abrasion resistance, potassium titanate, lithium potassium titanate, and magnesium potassium titanate are preferred.

In addition, the titanate compound may be subjected to a surface treatment with a silane coupling agent or the like from the viewpoint of improving the strength of the friction material. Further, the titanate compound may be subjected to a surface treatment with a water repellent from the viewpoint of increasing water repellency of the friction material.

From the viewpoint of preventing the generation of rust in the friction material, it is desirable to reduce a concentration of sulfate ion in the friction material, and it is also possible to use a titanate compound with fewer sulfate ion.

Examples of the organic filler include various rubber powder (such as raw rubber powder and tire powder), cashew dust, tire tread, melamine dust, and the like. These can be used alone or in combination of two or more thereof.

Examples of the abrasive include alumina, silica, magnesia, zirconia, zirconium silicate, chromium oxide, triiron tetroxide ($Fe_3O_4$), and chromite, and the like. These can be used alone or in combination of two or more thereof.

Examples of the solid lubricant include graphite, antimony trisulfide, molybdenum disulfide, tin sulfide, polytetrafluoroethylene (PTFE), and the like. The particle diameter of graphite is preferably 1 μm to 1000 μm. These can be used alone or in combination of two or more thereof.

A content of the copper component in the friction material of the present invention is preferably 0.5 mass % or less and it is more preferable not to contain the copper component, from the viewpoint of environmental impact reduction.

<Fibrous Material>

For the fibrous material contained in the friction material of the present invention, a commonly used fibrous material can be used by a usual amount. Specifically, an organic fiber, an inorganic fiber, and a metal fiber are used, but a copper fiber or a bronze fiber containing a copper component is not used.

As the organic fiber, for example, an aromatic polyamide (aramid) fiber or a flame resistant acrylic fiber is used. As the inorganic fiber, for example, a ceramic fiber, a bio-soluble inorganic fiber, a glass fiber, a carbon fiber, rock wool, or the like is used. As the metal fiber, a steel fiber is used, for example. These can be used alone or in combination of two or more thereof.

The fibrous material in the friction material is preferably used by 6 mass % to 12 mass % in the entire friction material.

Among these examples of the inorganic fiber, the bio-soluble inorganic fiber is preferred as the inorganic fiber because of having little influence on the human body. Examples of such a bio-soluble inorganic fiber include bio-soluble ceramic fibers such as a $SiO_2$—CaO—MgO fiber, a $SiO_2$—CaO—MgO—$Al_2O_3$ fiber, a $SiO_2$—MgO—SrO fiber, and the like, or bio-soluble rock wool, and the like.

The bio-soluble inorganic fiber preferably has 0.1 μm to 20 μm of a fiber diameter and 100 μm to 5000 μm of a fiber length.

In addition, the bio-soluble inorganic fiber may be subjected to a surface treatment with a silane coupling agent or the like from the viewpoint of improving the strength of the friction material.

<Binder>

As the binder contained in the friction material of the present invention, various commonly used binders can be used. Specific examples thereof include thermosetting resins such as a straight phenol resin, various modified phenol resins due to elastomer or the like, a melamine resin, an epoxy resin, a polyimide resin, and the like. Examples of the elastomer-modified phenol resin include an acrylic rubber-modified phenol resin, a silicone rubber-modified phenol resin, a nitrile rubber (NBR)-modified phenol resin, and the like. These binders can be used alone or in combination of two or more thereof.

Preferably, 6 mass % to 10 mass % of the binder is used in the entire friction material.

<Method for Manufacturing Friction Material>

The friction material of the present invention can be manufactured by a known manufacturing process. For example, the friction material can be prepared by blending the above components and subjecting the blend to steps such as preforming, hot-molding, heating, grinding, and the like according to an ordinary manufacturing method.

A general process in manufacturing a brake pad provided with a friction material is shown as follows.

(a) a step of molding a pressure plate into a predetermined shape by a sheet metal press;

(b) a step of applying a degreasing treatment, a chemical conversion treatment and a primer treatment to the pressure plate and coating the treated pressure plate with an adhesive;

(c) a step of blending raw materials such as a fibrous material, a friction modifier, a binder, and the like, sufficiently homogenizing the raw materials by mixing, and performing molding at a predetermined pressure at ordinary temperature to prepare a preform;

(d) a hot-molding step of fixing the preform and the pressure plate coated with the adhesive together by applying a predetermined temperature and a predetermined pressure to the two members (molding temperature: 130° C. to 180° C., molding pressure: 30 MPa to 80 MPa, molding time: 2 minutes to 10 minutes); and (e) a step of performing after-curing (150° C. to 300° C., 1 hour to 5 hours) and finally finishing treatment such as grinding, scorching, painting, and the like.

Embodiments

The present invention will be specifically described by way of the following embodiments, but the present invention is not limited thereto.

Embodiments 1 to 11 and Comparative Examples 1 to 4

<Preparation of Friction Material>

Raw materials for the friction material blended composition shown in Table 1 were mixed for 4 minutes with a mixer, the mixture was put into a mold and pressed at a 20 MPa of pressure for 10 seconds to prepare a preform.

The obtained preform was put into a hot-molding die, a metal plate previously coated with an adhesive was stacked, and heat compression molding was performed for 5 minutes at a 40 MPa of pressure and 150° C. of a molding temperature to prepare a heat compression molded body.

The obtained heat compression molded body was subjected to a heat treatment at 230° C. for 3 hours, grounden and painted to prepare friction materials of Embodiments 1 to 11 and Comparative Examples 1 to 4.

<Evaluation Test of Friction Material>

An instantaneous minimum friction coefficient, abnormal noise, and a disc rotor wear amount were measured for the friction materials of Embodiments 1 to 11 and Comparative Examples 1 to 4 prepared above.

(Instantaneous Minimum Friction Coefficient)

A friction performance test according to JASO C406 was performed on each friction material with a brake dynamometer, and the instantaneous minimum friction coefficient (μ) in a first fade was measured and evaluated based on the following criteria. The results are shown in Table 1.

Instantaneous minimum friction coefficient (μ) is 0.25 or more: ◉

Instantaneous minimum friction coefficient (μ) is 0.23 or more and less than 0.25: ○

Instantaneous minimum friction coefficient (μ) is 0.21 or more and less than 0.23: Δ

Instantaneous minimum friction coefficient (μ) is less than 0.21: x (Abnormal Noise)

An abnormal noise test was performed on an actual vehicle under the following conditions.

Vehicle type: SUV AT vehicle
Vehicle weight: 2000 kg
Brake pad: friction materials of Embodiments 1 to 11 and Comparative Examples of 1 to 4

Burnishing was performed under the conditions of 30 km/h of an initial speed, 10 km/h of a braking final speed, 0.98 m/s² of a deceleration, and 4000 times of braking, and after leaving overnight (15 hours), the abnormal noise was evaluated.

For the evaluation of abnormal noise, in the above vehicle stopped at 1.0 MPa of a pad surface pressure, the sound pressure of the creep abnormal noise generated when the brake pedal was gradually released and the vehicle started with the creep force generated by vehicle power torque transmission was measured with a microphone installed in a headrest part of a passenger seat. This procedure was repeated 10 times, and a maximum sound pressure was measured and evaluated based on the following criteria. The results are shown in Table 1.

Maximum sound pressure is less than 60 dB: ◉

Maximum sound pressure is 60 dB or more and less than 65 dB:

Maximum sound pressure is 65 dB or more and less than 70 dB: Δ

Maximum sound pressure is 70 dB or more: x (Disc Rotor Wear Amount with Rotation at Low Pressure)

Test pieces were cut out from brake pads including the friction materials according to Embodiments 1 to 11 and Comparative Examples 1 to 4, and the disc rotor wear amount (μm) was measured at 40 hours after the test piece was pressed against the disc rotor with 0.06 MPa of a surface pressure using a ⅐ scale tester and the rotation is performed at 60 km/h of a speed.

Disc rotor wear amount is less than 10 μm: ◉

Disc rotor wear amount is 10 μm or more and less than 15 μm: ○

Disc rotor wear amount is 15 μm or more and less than 20 μm: Δ

Disc rotor wear amount is 20 μm or more: x

TABLE 1

| | | | | | | | | | Embodiment | | | | | (Mass %) |
|---|---|---|---|---|---|---|---|---|---|---|---|---|---|---|
| | | | | | | 1 | 2 | 3 | 4 | 5 | 6 | 7 | 8 |
| Blended composition | Binder | Straight phenol resin | | | | 8 | 8 | 8 | 8 | 8 | 8 | 8 | 8 |
| | Friction modifier | Granulated hematite fired particle | Average particle diameter 90 μm | Fine pore volume 100 mm³/g | | 5 | 10 | 20 | 25 | — | — | — | — |
| | | | Average particle diameter 25 μm | Fine pore volume 100 mm³/g | | — | — | — | — | 5 | — | — | — |
| | | | Average particle diameter 40 μm | Fine pore volume 100 mm³/g | | — | — | — | — | — | 5 | — | — |
| | | | Average particle diameter 150 μm | Fine pore volume 100 mm³/g | | — | — | — | — | — | — | 5 | — |
| | | | Average particle diameter 300 μm | Fine pore volume 100 mm³/g | | — | — | — | — | — | — | — | 5 |
| | | | Average particle diameter 90 μm | Fine pore volume 30 mm³/g | | — | — | — | — | — | — | — | — |
| | | | Average particle diameter 90 μm | Fine pore volume 150 mm³/g | | — | — | — | — | — | — | — | — |
| | | | Average particle diameter 90 μm | Fine pore volume 260 mm³/g | | — | — | — | — | — | — | — | — |
| | | | Average particle diameter 15 μm | Fine pore volume 100 mm³/g | | — | — | — | — | — | — | — | — |
| | | | Average particle diameter 90 μm | Fine pore volume 10 mm³/g | | — | — | — | — | — | — | — | — |
| | | Fe₃O₄ | Average particle diameter 0.5 μm | Fine pore volume 2 mm³/g | | — | — | — | — | — | — | — | — |
| | | Copper powder | | | | — | — | — | — | — | — | — | — |
| | | Cashew dust | | | | 4 | 4 | 4 | 4 | 4 | 4 | 4 | 4 |
| | | Tire tread | | | | 3 | 3 | 3 | 3 | 3 | 3 | 3 | 3 |
| | | Graphite | | | | 7 | 7 | 7 | 7 | 7 | 7 | 7 | 7 |
| | | Tin sulfide | | | | 2 | 2 | 2 | 2 | 2 | 2 | 2 | 2 |
| | | Calcium hydroxide | | | | 3 | 3 | 3 | 3 | 3 | 3 | 3 | 3 |
| | | Mica | | | | 3 | 3 | 3 | 3 | 3 | 3 | 3 | 3 |
| | | Potassium titanate | | | | 15 | 15 | 15 | 15 | 15 | 15 | 15 | 15 |
| | | Barium sulfate | | | | 33 | 28 | 18 | 13 | 33 | 33 | 33 | 33 |
| | | Zirconium silicate | | | | 4 | 4 | 4 | 4 | 4 | 4 | 4 | 4 |
| | | Zinc powder | | | | 3 | 3 | 3 | 3 | 3 | 3 | 3 | 3 |
| | Fibrous material | Aramid fiber | | | | 4 | 4 | 4 | 4 | 4 | 4 | 4 | 4 |
| | | Bio-soluble inorganic fiber | | | | 6 | 6 | 6 | 6 | 6 | 6 | 6 | 6 |
| | | Total | | | | 100 | | | | | | | |
| Evaluation | Creep abnormal nose | Maximum sound pressure [dB] after leaving overnight | | | | 64 | 63 | 58 | 59 | 64 | 63 | 62 | 61 |
| | | | | | | ○ | ○ | ◉ | ◉ | ○ | ○ | ○ | ○ |
| | Fade resistance | JASO C406 first fade Instantaneous minimum friction coefficient [—] in one braking | | | | 0.23 | 0.25 | 0.27 | 0.28 | 0.24 | 0.24 | 0.23 | 0.23 |
| | | | | | | ○ | ◉ | ◉ | ◉ | ○ | ○ | ○ | ○ |

TABLE 1-continued

| | | | | 9 | 11 | 14 | 18 | 6 | 7 | 13 | 19 |
|---|---|---|---|---|---|---|---|---|---|---|---|
| Aggressiveness against the counterpart material | Disc rotor wear amount [μm] with rotation at low pressure | | | ⊚ | ○ | ○ | Δ | ⊚ | ⊚ | ○ | Δ |

| | | | | Embodiment | | | Comparative Example | | | | (Mass %) |
|---|---|---|---|---|---|---|---|---|---|---|---|
| | | | | 9 | 10 | 11 | 1 | 2 | 3 | 4 | |

| Category | Sub | Material | Specification | 9 | 10 | 11 | 1 | 2 | 3 | 4 |
|---|---|---|---|---|---|---|---|---|---|---|
| Blended composition | Binder | Straight phenol resin | | 8 | 8 | 8 | 8 | 8 | 8 | 8 |
| | Friction modifier | Granulated hematite fired particle | Average particle diameter 90 μm Fine pore volume 100 mm³/g | — | — | — | — | — | — | — |
| | | | Average particle diameter 25 μm Fine pore volume 100 mm³/g | — | — | — | — | — | — | — |
| | | | Average particle diameter 40 μm Fine pore volume 100 mm³/g | — | — | — | — | — | — | — |
| | | | Average particle diameter 150 μm Fine pore volume 100 mm³/g | — | — | — | — | — | — | — |
| | | | Average particle diameter 300 μm Fine pore volume 100 mm³/g | — | — | — | — | — | — | — |
| | | | Average particle diameter 90 μm Fine pore volume 30 mm³/g | 5 | — | — | — | — | — | — |
| | | | Average particle diameter 90 μm Fine pore volume 150 mm³/g | — | 5 | — | — | — | — | — |
| | | | Average particle diameter 90 μm Fine pore volume 260 mm³/g | — | — | 5 | — | — | — | — |
| | | | Average particle diameter 15 μm Fine pore volume 100 mm³/g | — | — | — | — | 5 | — | — |
| | | | Average particle diameter 90 μm Fine pore volume 10 mm³/g | — | — | — | — | — | 5 | — |
| | | $Fe_3O_4$ | Average particle diameter 0.5 μm Fine pore volume 2 mm³/g | — | — | — | — | — | — | 5 |
| | | Copper powder | | — | — | — | 5 | — | — | — |
| | | Cashew dust | | 4 | 4 | 4 | 4 | 4 | 4 | 4 |
| | | Tire tread | | 3 | 3 | 3 | 3 | 3 | 3 | 3 |
| | | Graphite | | 7 | 7 | 7 | 7 | 7 | 7 | 7 |
| | | Tin sulfide | | 2 | 2 | 2 | 2 | 2 | 2 | 2 |
| | | Calcium hydroxide | | 3 | 3 | 3 | 3 | 3 | 3 | 3 |
| | | Mica | | 3 | 3 | 3 | 3 | 3 | 3 | 3 |
| | | Potassium titanate | | 15 | 15 | 15 | 15 | 15 | 15 | 15 |
| | | Barium sulfate | | 33 | 33 | 33 | 33 | 33 | 33 | 33 |
| | | Zirconium silicate | | 4 | 4 | 4 | 4 | 4 | 4 | 4 |
| | | Zinc powder | | 3 | 3 | 3 | 3 | 3 | 3 | 3 |
| | Fibrous material | Aramid fiber | | 4 | 4 | 4 | 4 | 4 | 4 | 4 |
| | | Bio-soluble inorganic fiber | | 6 | 6 | 6 | 6 | 6 | 6 | 6 |
| | | Total | | | | | 100 | | | |
| Evaluation | Creep abnormal noise | Maximum sound pressure [dB] after leaving overnight | | 62 ○ | 63 ○ | 62 ○ | 66 Δ | 70 X | 64 ○ | 71 X |
| | Fade resistance | JASO C406 first fade Instantaneous minimum friction coefficient [—] in one braking | | 0.22 Δ | 0.25 ⊚ | 0.24 ○ | 0.24 ○ | 0.22 Δ | 0.21 Δ | 0.19 X |
| | Aggressiveness against the counterpart material | Disc rotor wear amount [μm] with rotation at low pressure | | 14 ○ | 7 ⊚ | 7 ⊚ | 6 ⊚ | 6 ⊚ | 21 X | 5 ⊚ |

As seen from the results in Table 1, in the friction materials according to Embodiments 1 to 11 including the granulated hematite fired particle having 25 μm to 300 μm of an average particle diameter and 30 mm³/g to 300 mm³/g of a fine pore volume, the creep abnormal noise is reduced, sufficient fade resistance is ensured, and aggressiveness against the counterpart material is reduced, compared with the friction materials according to Comparative Examples 1 to 4.

Although the present invention has been described in detail using specific embodiments, it will be apparent to those skilled in the art that various modifications and changes are possible without departing from the spirit and scope of the present invention. The present application is based on a Japanese Patent Application (Japanese Patent Application No. 2017-153092) filed on Aug. 8, 2017, whose contents are incorporated herein by reference.

The invention claimed is:

1. A friction material comprising: granulated hematite fired particle having 90 μm to 300 μm of an average particle diameter and 100 mm³/g to 300 mm³/g of a fine pore volume.

2. The friction material according to claim 1, wherein 5 mass % to 25 mass % of the granulated hematite fired particle is contained.

3. The friction material according to claim 1, wherein a content of a copper component is 0.5 mass % or less.

4. The friction material according to claim 2, wherein a content of a copper component is 0.5 mass % or less.

* * * * *